United States Patent
Saeed et al.

(10) Patent No.: US 11,965,052 B2
(45) Date of Patent: Apr. 23, 2024

(54) PROCESS FOR THE PREPARATION OF AN UHMWPE HOMOPOLYMER

(71) Applicant: BOREALIS AG, Vienna (AT)

(72) Inventors: Irfan Saeed, Porvoo (FI); Esa Kokko, Porvoo (FI); Mika Salo, Porvoo (FI); Sanjay Rastogi, Eindhoven (NL); Dario Romano, Maastricht (NL); Sara Ronca, Leicestershire (GB)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/111,025

(22) Filed: Feb. 17, 2023

(65) Prior Publication Data

US 2023/0322969 A1 Oct. 12, 2023

Related U.S. Application Data

(62) Division of application No. 17/261,317, filed as application No. PCT/EP2019/069397 on Jul. 18, 2019, now Pat. No. 11,680,114.

(30) Foreign Application Priority Data

Jul. 19, 2018 (EP) .................................... 18184561

(51) Int. Cl.
*C08F 110/02* (2006.01)
*C08F 2/00* (2006.01)
(Continued)

(52) U.S. Cl.
CPC ............ *C08F 4/6492* (2013.01); *C08F 2/001* (2013.01); *C08F 4/025* (2013.01); *C08F 4/6546* (2013.01);
(Continued)

(58) Field of Classification Search
CPC ................ C08F 110/02; C08F 2500/01; C08F 2500/12; C08F 2500/26; C08L 23/06; C08L 2203/16; C08L 2207/068
See application file for complete search history.

(56) References Cited

U.S. PATENT DOCUMENTS 3,242,150 A 3/1966 Scoggin
3,324,093 A 6/1967 Alleman
(Continued)

FOREIGN PATENT DOCUMENTS

CN 103193908 7/2013
CN 105164200 12/2015
(Continued)

OTHER PUBLICATIONS

Zuo, Jian-Dong, et al. "Preparation of HDPE/UHMWPE/MMWPE blends by two-step processing way and properties of blown films." Polymer Bulletin 58.4 (2007): 711-722.

(Continued)

*Primary Examiner* — Catherine S Branch
(74) *Attorney, Agent, or Firm* — Meunier Carlin & Curfman LLC

(57) ABSTRACT

A process for the preparation of an ultra-high molecular weight ethylene homopolymer having a MFR$_{21}$ of 0.01 g/10 min or less, said process comprising:
(I) prepolymerising at least ethylene at a temperature of 0 to 90° C. in the presence of a heterogeneous Ziegler Natta catalyst to prepare an ethylene prepolymer having an Mw of 40,000 to 600,000 g/mol; and thereafter in the presence of the prepolymer and said catalyst;
(II) polymerising ethylene at a temperature of 55° C. or less, such as 20 to 55° C., to prepare said UHMW ethylene homopolymer;
(Continued)

wherein the UHMW ethylene homopolymer comprises up to 8 wt. % of said prepolymer.

10 Claims, 3 Drawing Sheets

(51) Int. Cl.
    *C08F 4/02*     (2006.01)
    *C08F 4/649*     (2006.01)
    *C08F 4/654*     (2006.01)
    *C08F 4/655*     (2006.01)
    *C08L 23/06*     (2006.01)

(52) U.S. Cl.
    CPC .......... *C08F 4/6555* (2013.01); *C08F 110/02* (2013.01); *C08L 23/06* (2013.01); *C08F 2500/01* (2013.01); *C08F 2500/12* (2013.01); *C08F 2500/26* (2013.01); *C08F 2500/34* (2021.01); *C08F 2500/35* (2021.01); *C08L 2203/16* (2013.01); *C08L 2207/068* (2013.01); *C08L 2314/02* (2013.01)

(56) References Cited

U.S. PATENT DOCUMENTS

| | | | |
|---|---|---|---|
| 3,374,211 A | 3/1968 | Marwil et al. | |
| 3,405,109 A | 10/1968 | Rohlfing | |
| 4,532,311 A | 7/1985 | Fulks et al. | |
| 4,543,399 A | 9/1985 | Jenkins, III et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 5,391,654 A | 2/1995 | Ahvenainen et al. | |
| 2006/0142521 A1 | 6/2006 | Rastogi et al. | |
| 2008/0312388 A1 | 12/2008 | Mei et al. | |

FOREIGN PATENT DOCUMENTS

| | | | |
|---|---|---|---|
| CN | 105593285 | 5/2016 | |
| CN | 105985465 | 10/2016 | |
| EP | 0160500 | 11/1985 | |
| EP | 0188125 | 7/1986 | |
| EP | 0250169 | 12/1987 | |
| EP | 0428054 | 5/1991 | |
| EP | 0479186 | 4/1992 | |
| EP | 0499759 | 8/1992 | |
| EP | 0600414 | 6/1994 | |
| EP | 0688794 | 12/1995 | |
| EP | 0721798 | 7/1996 | |
| EP | 0560035 | 10/1997 | |
| EP | 0810235 | 12/1997 | |
| EP | 0699213 | 2/1998 | |
| EP | 0579426 | 3/1998 | |
| EP | 0684871 | 5/1998 | |
| EP | 0891990 | 1/1999 | |
| EP | 0696293 | 5/2000 | |
| EP | 1057835 | 12/2000 | |
| EP | 1310295 | 5/2003 | |
| EP | 0887380 | 2/2004 | |
| EP | 1415999 | 5/2004 | |
| EP | 0887379 | 12/2004 | |
| EP | 1484343 | 12/2004 | |
| EP | 0887381 | 11/2005 | |
| EP | 1591460 | 11/2005 | |
| EP | 1605000 | 12/2005 | |
| EP | 0991684 | 1/2006 | |
| EP | 1633466 | 3/2010 | |
| WO | 92/12182 | 7/1992 | |
| WO | 94/25495 | 11/1994 | |
| WO | 96/18662 | 6/1996 | |
| WO | 96/19503 | 6/1996 | |
| WO | 96/32420 | 10/1996 | |
| WO | 97/04015 | 2/1997 | |
| WO | 99/51646 | 10/1999 | |
| WO | 00/26258 | 5/2000 | |
| WO | 00/29452 | 5/2000 | |
| WO | 01/05845 | 1/2001 | |
| WO | 2003/106510 | 12/2003 | |
| WO | 2005/087361 | 9/2005 | |
| WO | 2005/118655 | 12/2005 | |
| WO | 2006/022736 | 3/2006 | |
| WO | 2006/063771 | 6/2006 | |
| WO | 2006/120187 | 11/2006 | |
| WO | 2007/025640 | 3/2007 | |
| WO | 2009076152 | 6/2009 | |
| WO | 2010/139720 | 12/2010 | |
| WO | 2013/098139 | 7/2013 | |
| WO | 2014/096296 | 6/2014 | |
| WO | 2014/096297 | 6/2014 | |
| WO | 2014177547 | 11/2014 | |
| WO | WO-2015022708 A1 * | 2/2015 | .......... F41H 5/0485 |
| WO | 2015/121162 | 8/2015 | |
| WO | 2016050774 | 4/2016 | |
| WO | 2016/097193 | 6/2016 | |

OTHER PUBLICATIONS

Aiello, Roberto, and Francesco Paolo La Mantia. "On the Improvement of the Processability of UHMW-HDPE by Adding a Liquid Crystalline Polymer and a Fluoroelastomer." Macromolecular Materials and Engineering 286.3 (2001): 176-178.
Xie, Meiju, and Huilin Li. "Viscosity reduction and disentanglement in ultrahigh molecular weight polyethylene melt: Effect of blending with polypropylene and poly (ethylene glycol)." European polymer journal 43.8 (2007): 3480-3487.
Rastogi, S., et al. "Novel route to fatigue-resistant fully sintered ultrahigh molecular weight polyethylene for knee prosthesis." Biomacromolecules 6.2 (2005): 942-947.
Rastogi, Sanjay, et al. "Disentangled state in polymer melts; a route to ultimate physical and mechanical properties." Macromolecular Materials and Engineering 288.12 (2003): 964-970.
Rastogi, Sanjay, et al. "Heterogeneity in polymer melts from melting of polymer crystals." Nature Materials 4.8 (2005): 635-641.
Talebi, Saeid, et al. "Molar mass and molecular weight distribution determination of UHMWPE synthesized using a living homogeneous catalyst." Macromolecules 43.6 (2010): 2780-2788.
Extended European Search Report issued for Application No. 18184561.1, dated Jan. 24, 2019.
International Search Report and Written Opinion in PCT/EP2019/069397, dated Oct. 24, 2019.
Martin, Ruff et al. Controlling Polyolefin Properties by In-Reactor Blending, 1-Polymerization Process, Precise Kinetics, and Molecular Properties of UHMW-PE Polymers. Macromolecular Reaction Engineering, vol. 6, No. 8, Jul. 24, 2012 (Jul. 24, 2012), pp. 302-317.

* cited by examiner

PROCESS FOR THE PREPARATION OF AN UHMWPE HOMOPOLYMER

CROSS REFERENCE TO RELATED APPLICATIONS

This application is a divisional of U.S. application Ser. No. 17/261,317, filed Jan. 19, 2021, which is a U.S. National Phase filing under § 371 of International Application PCT/EP2019/069397, filed Jul. 18, 2019, which claims the benefit of priority to EP application 18184561.1, filed Jul. 19, 2018, the disclosures of each are incorporated by reference herein in their entireties.

This invention concerns ultra high molecular weight (UHMW) polyethylene homopolymers. In particular, the invention relates to a two-step process for the manufacture of a UHMW polyethylene homopolymer that can be processed into elongated objects in the solid-state. The process requires a pre-polymerisation step followed by a low temperature main polymerisation step. The invention also covers articles, preferably tapes, comprising the UHMW polyethylene homopolymer.

BACKGROUND

Ultra-high molecular weight polyethylene (UHMWPE) has a very high molecular weight (typically Mw>1 million) and therefore has outstanding physical and chemical properties, such as high abrasion resistance, high impact toughness, excellent resistance to corrosion and chemical degradation, resistance to cyclic fatigue and radiation.

However, increased molecular weight adversely affects the polymer processability due to increased number of entanglements per chain. High entanglement density imparts excellent mechanical properties but restricts the mobility of the polymer chains in the melt during processing of the polymer into products. The high melt viscosity causes poor homogeneity of the processed product obtained from such a high molecular weight material. Therefore, plasticization of the entanglement network in an UHMWPE will allow easier processing with enhanced flow characteristics.

Lowering of physical contact (entanglements) between the neighbouring chains is therefore desired to enable processing of the UHMWPE homopolymer, e.g. in a solid-state, into high tenacity/high modulus fibres and tapes.

A way to reduce contact between the chains (entanglements) of UHMWPE (having weight average molar mass greater than a million g/mol), is the use of toxic solvents during the production of high modulus and high strength fibers. In this process entanglement density (number of contacts per chain) is reduced by dissolving approximately 5 wt. % of the polymer in 95 wt. % of a toxic and expensive solvent, such as decalin or xylene. This is not an attractive method for improving processability as the solvent used has to be recovered and treated according to health and environmental requirements. Moreover, solvent residues are found in the end product. It is a feature of this invention that no toxic solvents such as decalin or xylene are used and hence no residues of such solvents are present.

Another option to improve processability is the combination of the UHMWPE with a second material such as another polymer or a polymer processing aid. Zuo, Polym. Bull. (Heidelberg, Ger.) 58(4), 711-722 used MMWPE as a compatibilizer/lubricant for UHMWPE/HDPE in two-step blending process and reported improved processability, homogeneity and mechanical performance compared to direct processing. However, due to the high melt viscosity of UHMWPE, homogeneous mixing is demanding.

Aiello, R., Macromol. Mater. Eng., 286(3), 176-178, 2001 report reduced die pressure and torque when up to 2% of processing aid (either liquid crystalline polymer or fluoroelastomer) was added for extrusion of UHMWPE. However, highly oriented chains required for high modulus and high strength of elongated objects could not be obtained.

Xie, European Polymer Journal, 43(8), 3480-3487, 2007 found a significant reduction in melt viscosity of UHMWPE by blending with polypropylene (PP) and poly(ethylene glycol) (PEG). They discovered the entanglement level of UHMWPE decreased with the addition of PP and/or a small amount of PEG. However, due to molecular immiscibility oriented structures required for high tensile modulus and high tensile strength could not be obtained.

In summary, in all of these processes UHMWPE chains are inherently entangled and the addition of the secondary component does not fully resolve the processing limitations.

Therefore, attempts have been made to prepare UHMWPE with reduced number of entanglements per chain. In general, to produce low-entangled UHMWPE, a single site homogeneous catalyst system with low catalyst concentration is preferred. For example, homogeneous single site catalyst systems having the active sites spaced apart in the reaction media. This spacing reduces the number of chain entanglements.

EP 1057835, describes a process for the polymerisation of ethylene at a temperature between −50 and 50° C. with a lanthanide catalyst. The catalyst is used for the production of polyethylene with a low degree of chain entanglement due to crystallisation of individual chains during polymerisation.

US 2006/0142521 describes a process for the preparation of a shaped part of an ultrahigh molecular weight polyethylene (UHMWPE) wherein an ultrahigh molecular weight polyethylene with a low degree of entanglement is produced by polymerisation of ethylene at a temperature of 225 to 325 K using an unsupported single-site catalyst.

WO 2010/139720 claims a process for manufacturing an ultra-high molecular weight polyethylene wherein olefin monomers are contacted with a single site catalyst on a particulate carrier with a certain site density. The concept is to keep the catalyst particles as far away from each other as possible to avoid entangling molecular chains and this demands a low site density, possibly at the expensive of polymer yield.

In WO 2015/121162, production of low-entangled high or ultrahigh molecular weight polyethylene in an unimodal slurry phase process is described using Ziegler-Natta catalysts.

In Rastogi et al, Macromolecular Materials and Engineering 2003, 288, No. 12 p 964-70, UHMWPE is prepared with low disentanglement using a low temperature single site based polymerisation.

The process of the present invention improves upon the principles outlined in WO 2015/121162 by using a two-step process for the preparation of the UHMWPE.

There remains a need to devise new processes for the manufacture of UHMWPE polymers that can be processed into elongated objects in the solid state. The present inventors have now found that it is possible to produce UHMWPE homopolymers having a well-mixed low molar mass component together with a lower degree of entanglement density using a heterogeneous Ziegler Natta catalyst in a two-step polymerisation process. The inventors have appreciated that a pre-polymerisation step is critical to preparing a homogeneously mixed low molar mass component in the final UHMWPE. Mixing is done in situ during the polymerisation process, and not by blending separate materials after polymerisation. Without being limited by theory, it is envisaged that the use of a pre-polymerisation step helps to increase the distance between the active sites, thus reducing the probability of chain entanglement during the polymerisation. Inventors also use a low temperature polymerisation step. This approach allows increasing distance between the active sites, and when combined with the low temperature polymerisation process, the nucleation barrier required for crystallisation is suppressed. This means that the process can have a crystallisation rate higher than the polymerisation rate.

The pre-polymerisation step also favours the formation of low entanglements in the non-crystalline domains of the semi-crystalline polymer. In this regard, the pre-polymerisation temperature, and Mw of the polymer obtained in the pre-polymerisation step play an important role in reducing entanglement density in combination with homogeneous mixing of low molar mass component.

For an example, radius of gyration ($R_g$) increases with the increasing number of methylene units (N) covalently connected by bond length ($l_b$) i.e. $R_g \sim (Nl_b^2)^{0.5}$, therefore influencing the separation between the active sites in the pre-polymerisation step.

The pre-polymerisation is followed by a low temperature main polymerisation process. The use of a low temperature and a catalyst that is subject to pre-polymerisation ensures that the polymer crystallises and helps in the reduction of entanglements formation. A fundamental pre-requisite for achieving the low-entangled state is that the crystallisation rate must be higher than the polymerisation rate. The present inventors appreciate that this can be achieved following the process described herein using a pre-polymerisation and subsequent low temperature polymerisation. The lower polymerisation temperature suppresses the nucleation barrier for enhancing the crystallisation rate.

SUMMARY OF INVENTION

Thus, viewed from a first aspect the invention provides a process for the preparation of an ultra-high molecular weight ethylene homopolymer having a weight average molecular weight (Mw) of at least 1,000 kg/mol, said process comprising:
 (I) pre-polymerising at least ethylene at a temperature of 0 to 90° C. in the presence of a heterogeneous Ziegler Natta catalyst to prepare an ethylene prepolymer having a Mw of 40,000 to 600,000 g/mol; and thereafter in the presence of the prepolymer and said catalyst;
 (II) polymerising ethylene at a temperature of 55° C. or less, such as 20 to 55° C., to prepare said UHMW ethylene homopolymer;
 wherein the UHMW ethylene homopolymer comprises up to 8 wt. % of said prepolymer.

Alternatively viewed, the invention a process for the preparation of an ultra-high molecular weight ethylene homopolymer having an $MFR_{21}$ of 0.01 g/10 min or less, e.g. an unmeasurable $MFR_{21}$, said process comprising:
 (I) pre-polymerising at least ethylene at a temperature of 0 to 90° C. in the presence of a heterogeneous Ziegler Natta catalyst to prepare an ethylene prepolymer having a Mw of 40,000 to 600,000 g/mol; and thereafter in the presence of the prepolymer and said catalyst;
 (II) polymerising ethylene at a temperature of 55° C. or less, such as 20 to 55° C., to prepare said UHMW ethylene homopolymer;
 wherein the UHMW ethylene homopolymer comprises up to 8 wt. % of said prepolymer.

Viewed from another aspect the invention provides a process for the preparation of an ultra-high molecular weight ethylene homopolymer, said process comprising:
 (I) prepolymerising at least ethylene in the presence of hydrogen at a temperature of 0 to 90° C. and in the presence of a heterogeneous Ziegler Natta catalyst to prepare an ethylene prepolymer having an Mw of 40,000 to 600,000 g/mol;
 (II) flashing to remove any hydrogen from step (I); and thereafter in the presence of the prepolymer and said catalyst;
 (III) polymerising ethylene in the absence of hydrogen at a temperature of 55° C. or less, such as 20 to 55° C., to prepare an UHMW ethylene homopolymer;
 wherein the UHMW ethylene homopolymer comprises up to 8 wt. % of said prepolymer.

Viewed from another aspect the invention provides an ultra-high molecular weight ethylene homopolymer obtained by a process as hereinbefore defined, e.g. one having a weight average molecular weight (Mw) of at least 1000 kg/mol or an $MFR_{21}$ of 0.01 g/10 min or less, such as an unmeasurable $MFR_{21}$.

Viewed from another aspect the invention provides an ultra-high molecular weight ethylene homopolymer having a weight average molecular weight (Mw) of at least 1000 kg/mol or an $MFR_{21}$ 0.01 g/10 min or less having:
 a peak melting point is 137 to 142.0° C.;
 $\Delta H_{melt}$ is 170 to 240 J/g; and
 a crystallinity of 60 to 80%. Preferably $T_{onset}$ is in the range of 134.0 to 139.0° C.

It is an important aspect of the invention that the UHMWPE can be processed into elongated objects in the solid state. The UHMWPE polymer can be compressed in the solid state, below the onset of melting temperature (e.g. in the temperature range not exceeding 137° C.), preferably below 135° C. The UHMWPE polymer can then be simultaneously rolled and stretched ideally below the peak melting temperature. The simultaneously rolled and stretched material could be drawn further at a temperature between 145 to 155° C., preferably between 147 to 152° C., by more than 100 times its initial length under tension. The tension is required to overcome contraction of the sample i.e. raising the melting temperature by applying constraint.

The term ultrahigh molecular weight implies a Mw of at least 1,000 kg/mol or alternatively a $MFR_{21}$ of the UHMWPE polymer of the invention is 0.01 g/10 min (ISO1133, 190° C., 21.6 kg load) or less. Preferably, it is not possible to measure $MFR_{21}$ due to the very high Mw.

Viewed from another aspect the invention provides an article, preferably a tape, comprising the ultra-high molecular weight ethylene homopolymer as hereinbefore described.

Viewed from another aspect the invention provides the use of an ultra-high molecular weight ethylene homopolymer as hereinbefore defined in the manufacture of an article, especially a tape.

Definitions

The tests for any claimed parameter are given in the "analytical tests" section of the text which precedes the examples.

The term heterogeneous Ziegler Natta (ZN) catalyst implies that the ZN catalyst is insoluble in the medium used for the pre-polymerisation and polymerisation. A solution of the catalyst in the reaction medium is not formed in the claimed process.

Wherever the term "Mw" is used herein, the weight average molecular weight is meant. Wherever the term "Mn" is used herein, the number average molecular weight is meant.

The UHMWPE homopolymer of the invention is the polymer that is formed from the combination of the pre-polymer and the polymer formed in the main polymerisation step.

The term main polymerisation is used herein to describe the polymerisation step that occurs after the pre-polymerisation. The process of the invention preferably consists of two steps, a pre-polymerisation step followed by the polymerisation step.

It is an important aspect of the invention that the UHMWPE can be processed into elongated objects in the solid state. By elongated in the solid state is meant that the UHMWPE polymer can be compressed in the solid state, below the onset of melting temperature and then be simultaneously rolled and stretched below the peak melting temperature.

DETAILED DESCRIPTION OF INVENTION

The present invention relates to a process for the preparation of an UHMWPE homopolymer in a two-step process. The process requires a pre-polymerisation step to prepare a prepolymer. Thereafter, the main polymerisation step takes place in the presence of the prepolymer and the catalyst used to prepare that prepolymer. As explained below, the two step process is carefully controlled to ensure that the UHMWPE homopolymer that is produced has a low level of entanglement.

A low degree of entanglement is also favoured by reducing the partial pressure of monomer present in the main polymerisation reactor, i.e. a reduction in the monomer concentration.

Catalyst

The process of the invention relies on the use of a heterogeneous Ziegler Natta (ZN) catalyst. As homogenous polymerisation is not industrially viable due to very poor control over polymer morphology, the process of the invention is achieved using a heterogeneous Ziegler-Natta (ZN) catalyst system, i.e. one in which the catalyst is not dissolved in the reaction medium. Typically, therefore the catalyst is supported.

Advantageously, the active sites on such a support are spaced apart to reduce chain entanglement. The required distance between the active sites on a judiciously chosen support can be achieved by introducing a pre-polymerisation step, in particular one with the preferred features defined herein. The reduced entanglements allow the ZN polymer to be processable in the solid state.

The catalyst is one which is preferably carried on a support. Generally, the ZN catalyst comprises at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), optionally a compound of group 13 of the Periodic Table (IUPAC) and optionally an internal organic compound, like an internal electron donor.

A ZN catalyst may also comprise further catalyst component(s), such as a cocatalyst and optionally external additives, like an external electron donor.

Suitable Ziegler-Natta catalysts used in the present invention preferably contain a magnesium compound, an aluminium compound and a titanium compound supported on a particulate support.

The particulate support can be an inorganic oxide support, such as silica, alumina, titania, silica-alumina, silica-titania or a $MgCl_2$ based support. Preferably, the support is silica or a $MgCl_2$ based support, especially silica.

It is preferred if the particle size of the support is within certain limits. In particular, the support, typically silica, may have an average particle (D50) from 3 to 30 µm, e.g. 5 to 30 µm, preferably from 5 to 20 µm, more preferably or from 6 to 15 µm. The particle size of the support is important as it enables the formation of a catalyst in which the active sites are separated. It is known that avoiding entangled molecular chains can be improved by using a catalyst in which the active sites are spaced apart. We have found that the use of a catalyst support, in particular a silica catalyst support, having the particle size described above, results in an ideal active site distribution when used in the process of the invention. The combination of the pre-polymerisation step and the catalyst particle size, reduces the density of entanglement network and homogeneously mixes the low molar mass component polymerised in the pre-polymerisation step with the main polymer.

The presence of low entanglement density network in the solid state is identified by the possibility of elongation by more than 100 times after rolling and stretching of the compressed powder.

It is preferred if the ZN catalyst comprises a Group 2 metal compound preferably a magnesium compound. The magnesium compound is preferably the reaction product of a magnesium dialkyl and an alcohol. The alcohol is preferably a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different, such as C1-10 alkyl groups. Butyl-octyl magnesium is one example of the preferred magnesium dialkyls.

It is preferred if the ZN catalyst comprises an Al compound. The aluminium compound is preferably a chlorine containing aluminium alkyl. The alkyl group may contain 1 to 12, preferably 1 to 8, more preferably 1 to 4 carbon atoms. Especially preferred compounds are aluminium alkyl dichlorides and aluminium alkyl sesquichlorides, like methyl aluminium dichloride, ethyl aluminium dichloride or butyl aluminium dichloride, especially ethyl aluminium dichloride.

The transition metal compound of Group 4 to 6 metal is preferably a compound of Group 4 or 5 metal compound, like a titanium or vanadium compound, more preferably a halogen containing titanium compound, most preferably chlorine containing titanium compound. Especially preferred titanium compound is titanium tetrachloride.

The catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable Ziegler-Natta catalysts contain a titanium compound together with a magnesium halide compound acting as a support. Thus, the catalyst contains a titanium compound and optionally a Group 13 compound, for example an aluminium compound on a magnesium dihalide, like magnesium dichloride. Such catalysts are disclosed, for instance, in WO 2005/118655, EP 810235, WO2014/096296 and WO2016/097193.

A typical internal organic compound, if used, is chosen from the following classes: ethers, esters, amines, ketones, alcohols, anhydrides or nitriles or mixtures thereof. Preferably the internal organic compound is selected from ethers and esters, most preferably from ethers. Preferred ethers are of 2 to 20 carbon-atoms and especially mono, di or multi-cyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl)propane, 2,2-di-(2-furan)-propane, or isomers or mixtures thereof. Internal organic compounds are also often called as internal electron donors.

All these components are typically supported on the catalyst support.

Cocatalyst

The Ziegler-Natta catalyst can be used together with an activator. This may be supplied separately to the polymerisation process. Activator may also be called cocatalyst. Suitable activators are Group 13 metal compounds, typically Group 13 alkyl compounds and especially aluminium alkyl compounds, where the alkyl group contains 1 to 16 C-atoms. These compounds include trialkyl aluminium compounds, such as trimethylaluminium, triethylaluminium, tri-isobutylaluminium, trihexylaluminium and tri-n-octylaluminium, alkyl aluminium halides, such as ethylaluminium dichloride, diethylaluminium chloride, ethylaluminium sesquichloride, dimethylaluminium chloride and the like. Especially preferred activators are trialkylaluminiums, of which triethylaluminium, trimethylaluminium and tri-isobutylaluminium are particularly used.

The amount of the activator used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

External Electron Donors

The catalyst may comprise an external additive, like an external electron donor as a further catalyst component. This may be supplied separately to the polymerisation process. External electron donors are typically used in propylene polymerisation, but known to be used in ethylene polymerisation as well. Suitable external electron donors known in the art include ethers, ketones, amines, alcohols, phenols, phosphines and silanes. Examples of these compounds are given, among others, in WO 95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882.

External electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP 45976, EP 45977 and EP1538167.

It is especially preferred to use silanes selected from compounds of the general formula

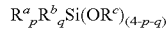

$R^a_p R^b_q Si(OR^c)_{(4-p-q)}$ wherein $R^a$, $R^b$ and $R^c$ denote a hydrocarbyl radical, in particular an alkyl or cycloalkyl group, and wherein p and q are numbers ranging from 0 to 3 with the sum p+q being equal to or less than 3. $R^a$, $R^b$ and $R^c$ can be chosen independently from one another and are linear, branched or cyclic hydrocarbyl groups having 1 to 12 carbon atoms, preferably $R^a$, $R^b$ and $R^c$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Suitable examples of this type of silanes are e.g. (tert-butyl)$_2$Si(OCH$_3$)$_2$, (cyclohexyl)(methyl)Si(OCH$_3$)$_2$, (phenyl)$_2$Si(OCH$_3$)$_2$, (cyclopentyl)$_2$Si(OCH$_3$)$_2$, (CH$_3$)$_2$Si(OCH$_3$)$_2$, (CH$_3$)$_2$Si(OCH$_2$CH$_3$)$_2$, (CH$_3$CH$_2$)$_2$Si(OCH$_2$CH$_3$)$_2$ and (CH$_3$CH$_2$)$_2$Si(OCH$_3$)$_2$.

As external donors may also be used silanes selected from compounds of the general formula

$Si(OCH_2CH_3)_3(NR^3R^4)$ wherein $R^3$ and $R^4$ can be the same or different a represent a linear, branched or cyclic hydrocarbon group having 1 to 12 carbon atoms, preferably $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

In one embodiment of the invention, the cocatalyst is fed to the pre-polymerisation reaction but no external electron donor is used. The external electron donor is however fed to the main polymerisation step.

Polymerisation Process

The UHMW ethylene homopolymer may be produced in a polymerisation process that requires a pre-polymerisation process followed by a main polymerisation process.

Whilst the process may be effected in one polymerisation zone (in which both steps are carried out consecutively), it is preferred if the process uses at least two polymerisation zones, e.g. two polymerisation vessels. The skilled person will be familiar with the steps required to transfer the product and catalyst from a pre-polymerisation vessel to the main polymerisation vessel.

The first polymerisation zone and the second polymerisation zone should be connected in series. It will be appreciated that the first step of the process results in the formation of a prepolymer and an activated catalyst. Both the prepolymer and the activated catalyst are transferred from the pre-polymerisation stage into the main polymerisation. In an industrial process this transfer may be continuous and the addition of new reactants and catalyst to the pre-polymerisation step may occur continuously.

It is preferred to remove the volatile reactants of the pre-polymerisation stage before introducing the product of the pre-polymerisation stage into the subsequent main polymerisation stage. A conventional flash step is therefore preferred as is well known in the art. It is preferred if no hydrogen is present in the main polymerisation.

Catalyst Feed

Catalyst is fed to the pre-polymerisation step. Fresh catalyst will not generally be fed to the main polymerisation although certain catalyst components may be added to the main polymerisation. All necessary catalyst components are introduced to the prepolymerisation step. Where the cocatalyst is fed separately it is possible that only a part of the cocatalyst is introduced into the prepolymerisation stage and the remaining part into subsequent main polymerisation stages. Also in such cases it is necessary to introduce so much cocatalyst into the prepolymerisation stage that a sufficient polymerisation reaction is obtained therein.

It may also be that external electron donor, which is not essential for catalyst function, is fed into either the pre-polymerisation step, the subsequent main polymerisation or both stages.

The catalyst may be transferred into the prepolymerisation zone by any means known in the art. It is thus possible to suspend the catalyst in a diluent and maintain it as homogeneous slurry. It is preferred if the catalyst is supplied as an oil having a viscosity from 20 to 1500 mPa·s as diluent, as disclosed in WO-A-2006/063771. It is also possible to mix the catalyst with a viscous mixture of grease and oil and feed the resultant paste into the prepolymerisation zone. Further still, it is possible to let the catalyst settle and introduce portions of thus obtained catalyst mud into the polymerisation zone in a manner disclosed, for instance, in EP-A-428054. The skilled person is able to manipulate the catalyst feed.

Pre-polymerisation

The process of the invention requires a prepolymerisation step. The purpose of the prepolymerisation is to polymerise a small amount of monomer to prepare a prepolymer and active catalyst. Typically, this process is effected at a low temperature and/or a low monomer concentration.

The prepolymerisation step may be conducted in slurry phase or in the gas phase. Preferably prepolymerisation is conducted in the slurry phase. Thus, the prepolymerisation step may be conducted in a dedicated slurry reaction vessel.

The prepolymerisation is preferably conducted in the presence of an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 25 to 75° C.

The pressure is not critical and is typically from 1 to 150 bar, preferably from 10 to 100 bar, especially 20 to 40 bar.

The residence time in the pre-polymerisation step is approximately 1 to 60 such as 1 to 30 minutes depending e.g. on the temperature. Residence time may be e.g. 1 to 40 minutes, such as 5 to 30 minutes. The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The pressure of ethylene within the pre-polymerisation reactor may be 2.5 to 5.0 bar. Alternatively viewed, the partial pressure of ethylene in the pre-polymerisation step may be 8 to 15% of the overall pressure in the reactor.

The pre-polymerisation process preferably produces an ethylene homopolymer. In theory, in addition to ethylene monomer it is possible to use one or more C3-10 alpha-olefin comonomers in the prepolymerisation step if desired. Suitable comonomers are, for example, 1-butene, 1-hexene, 4-methyl-1-pentene, 1-octene and their mixtures.

The molecular weight of the prepolymer may be controlled by hydrogen as is known in the art. In a preferred embodiment, hydrogen is present during the pre-polymerisation step. Hydrogen may form 1 to 5 mol % of the gaseous feed to pre-polymerisation step, such as 1.5 to 3 mol %. Alternatively viewed, the partial pressure of hydrogen in the pre-polymerisation step may be 1.3 to 8% of the overall pressure in the reactor.

The Mw of the polymer formed during the prepolymerisation step may range from 40,000 to 600,000 g/mol, preferably 100,000 to 600,000 g/mol, even more preferably at least 200,000 g/mol, such as 200,000 to 550,000 g/mol.

The amount of prepolymer is up to 8 wt. % of the UHMWPE homopolymer as a whole, such as 0.5 to 8.0 wt %, e.g. 1.0 to 8 wt %, such as 1.0 to 6.0 wt. %, especially 1.5 to 5.0 wt. %.

The pre-polymerisation temperature, the amount of prepolymer and the Mw of the prepolymer are all important factors in reducing the entanglement of the resulting UHMWPE. If the Mw of the prepolymer is too low and is produced in higher amount, it will affect the overall Mw of the final polymer. In a most unlikely situation, the final polymer may not be UHMWPE. On the other hand, if the Mw of the prepolymer is too high, it would lead to uncontrolled fragmentation in the polymerisation process.

We observe that a higher Mw prepolymer tends to improve the mechanical properties of the final polymer but reduces the processability. Reducing the content of prepolymer tends to improve the mechanical properties of the final polymer but reduces the processability. The process of the invention can therefore be tailored depending on the target desired.

As is well known, antistatic additives may be used to prevent the particles from adhering to each other or the walls of the reactor, as disclosed in WO-A-96/19503 and WO-A-96/32420.

The prepolymerisation process also improves the performance of the catalyst in main polymerisation step. A problem with a non prepolymerised catalyst is that the activity of the catalyst might be too high. A high activity catalyst leads to rapid polymerisation. As previously noted, a fundamental pre-requisite for achieving the non-entangled state is that the crystallisation rate must be higher than the polymerisation rate. A non prepolymerised catalyst has a tendency to lead to high polymerisation rates and hence entanglement.

So the prepolymerisation step allows the eventual polymers to be solid-state processed into tapes having high modulus and high breaking tenacity. The prepolymerisation fraction and Mw strongly influences the resulting mechanical properties of the tapes produced. The polymerisation temperature and ethylene pressure are also important for the synthesis of low entangled UHMWPE.

After the pre-polymerisation step, the volatiles present are preferably removed. Thus the reaction mixture is flashed to remove monomers, hydrogen and any other volatiles present. It is preferred if the main polymerisation step is effected in the absence of hydrogen.

It is preferred if the product of the pre-polymerisation is transferred from the pre-polymerisation vessel to the main polymerisation vessel, often a slurry loop reactor. The transfer process can be effected using known techniques. It will be appreciated that both the prepolymer and the activated heterogeneous ZN catalyst are transferred to the main polymerisation stage. Of course, if the main polymerisation is effected in the same vessel then no transfer is required. The main polymerisation can be started once the flash step has been effected.

In WO2016/050774, an "offline" catalyst activation step is disclosed in which a catalyst is contacted with ethylene before being recovered and isolated in solid form. The catalyst contains around 14 wt % prepolymer.

In the present invention, it is preferred if there is no recovery of the catalyst between prepolymerisation and main polymerisation steps. In one embodiment, it is preferred if the process of prepolymerisation and then main polymerisation is continuous. There should be no isolation step after prepolymerisation.

Moreover, the amount of prepolymer required in the present invention is significantly higher than amounts suggested in '774.

Main Polymerisation

The polymer that is formed in the main polymerisation is an ethylene homopolymer. There is no comonomer present in the main polymerisation.

The main polymerisation step may be conducted in the slurry phase. In the slurry phase, the polymer particles formed in the polymerisation, together with the catalyst fragmented and dispersed within the particles, are suspended in the fluid hydrocarbon. The slurry is agitated to enable the transfer of reactants from the fluid into the particles. This is preferably a loop reactor.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the main polymerisation step is important. According to the process of the present invention the polymerisation temperature is 55° C. or below, e.g. preferably in the range of 20 to 55° C., especially in the range of 25 to 50° C., most especially 30 to 45° C. Without wishing to be limited by theory, it is believed that the low temperature ensures that crystallisation occurs before entanglement. Low temperature polymerisation therefore reduces entanglement in the polymer. In one embodiment, the temperature in the main polymerisation step is lower than that of the pre-polymerisation step.

The pressure in the main polymerisation step conducted in the slurry phase polymerisation is preferably in the range of 10 to 30 bar, such as 10 to 25 bar.

Another important feature of the process of the invention is the amount of ethylene in the main polymerisation stage. Having a relatively low ethylene content appears to reduce chain entanglement. Low ethylene partial pressure appears to reduce polymerisation rate. It is thus preferred if the ethylene partial pressure within the main polymerisation zone is preferably 3 to 8 bar, such as 4 to 7 bar. Alternatively viewed, the ethylene partial pressure within the reactor is 10 to 35% of the overall pressure in the reactor. Thus if the reactor pressure is 30 bar, then the ethylene pressure might be 3 to 10.5 bar.

We have established that the best results are obtained with a polymerisation temperature of 30° C. and an ethylene partial pressure of 5 to 7 bar, especially 5.5 to 6.5 bar, like 6 bar.

The residence time within the main polymerisation is preferably 30 to 90 mins.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582, 816, 3,405,109, 3,324,093, EP-A-479186 and U.S. Pat. No. 5,391,654.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460.

The main polymerisation step contributes at least 92 wt. % of the UHMPE homopolymer, such as 99 to 94 wt. %, especially 99 to 95 wt. %.

UHMWPE Homopolymer

After the main polymerisation step, the UHMWPE can be recovered and can be further processed in the powder form. I.e. the polymer to be processed does not need to be pelletized, i.e. introduced in an extrusion process. The UHMWPE of the invention is a homopolymer. In this regard, the polymer is regarded as a homopolymer as long as the main polymerisation step is a homopolymerisation. If a small amount of comonomer is used in the pre-polymerisation step, we still regard the resulting polymer as a homopolymer as the comonomer content is de minimis. Ideally however, both prepolymer and main polymer components are homopolymers.

The UHMW polyethylene homopolymer of the invention preferably has Mw of at least 1,000,000 g/mol, preferably at least 1,200,000 g/mol, e.g. 1,000 kg/mol to 4,000 kg/mol.

The Mw/Mn of the UHMW PE homopolymer may be in the range of 2 to 9, preferably 2 to 5.

The UHMW homopolymer is preferably bimodal as the pre-polymerisation step accounts for the homogeneous mixing of the low molar mass component in the matrix of UHMWPE. This means that rheological estimation of molar mass requires bimodal parameters, as described in (Talebi, S.; Duchateau, R.; Rastogi, S.; Kaschta, J.; Peters, G. W. M.; Lemstra, P. J.; *Macromolecules* 2010 43 (6), 2780-2788. Molar mass and molecular weight determination of UHMWPE synthesized using a living homogenous catalyst). Molar mass of the samples can be determined using the rheological data acquired by performing frequency sweep experiments at 160° C.

The density of the UHMWPE homopolymer is typically in the range of 945 to 980 kg/m 3, such as 955 to 975 kg/m 3.

The value of $MFR_{21}$ is typically less than 0.01 g/10 min, which indicates a very high molecular weight of the polymer. The $MFR_{21}$ of the UHMW homopolymer is preferably too low to be measured.

The UHMWPE homopolymer of the invention is one that contains low levels of entanglement. Polymer chains can become entangled during polymerisation. This invention targets polymers that are not entangled (or with very low degree of entanglements) as these polymers exhibit much higher processability whilst retaining excellent mechanical properties.

When a polymer has a very high Mw, the increased number of entanglements per chain produces a polymer that is very difficult to process in the melted state. It has a very high melt viscosity. A way to overcome this challenge is the reduction of entanglements in the non-crystalline regions of the semi-crystalline state, i.e. solid state. The number of entanglements in the non-crystalline region has to be reduced to the extent that the polymer can be processed without melting.

The process of the present invention leads to UHMWPE homopolymers with low levels of entanglement in the solid state. The lower degree of entanglements in the solid state allows the polymer powder obtained from the reactor to be compressed below the onset of melting temperature, and then simultaneously rolled and stretched ideally below the peak melting temperature. The material can then be drawn further under tension by more than 100 times the initial length of the compressed film.

In a preferred embodiment therefore the UHMWPE of the invention can be compressed in powder form below the below the melting temperature, and preferably below the $T_{onset}$ value of the polymer, e.g. below 136.0° C., ideally below 135° C. The compressed material can be pre-stretched by rolling, preferably below the melting point of the polymer, e.g. below 139.0° C., ideally below 138° C. The rolled polymer often forms a film. The rolled material can then be stretched, e.g. at a temperature of 145-155° C. The stretching process can achieve a draw ratio of over 100, such as 100 to 250.

To achieve the goal of low entanglement density in the non-crystalline region we prepare the UHMWPE homopolymer in a low temperature process, the polymer crystallises before the chains have the chance to entangle. This means that the resulting polymer has certain characteristics that are remarkable for such a high Mw polymer. The UHMWPE homopolymer therefore forms a further aspect of the invention.

The UHMWPE homopolymer of the invention is also stretchable. Entangled commercial polymers tend to undergo brittle failure when stretched. As the chains are so intertwined in the non-crystalline region, the polymer does not undergo stretching easily.

A relatively low entangled polymer of the invention however can be stretched more readily. The presence of homogeneously mixed low molar mass component obtained in the pre-polymerisation step further facilitates processing of the compressed powder.

The ultra-high molecular weight ethylene homopolymer may have a peak melting point is 137 to 142.0° C., preferably 138.0 to 142.0° C.

The ultra-high molecular weight ethylene homopolymer may have a onset melting point is 132 to 137.0° C.

The ultra-high molecular weight ethylene homopolymer may have $\Delta H_{melt}$ of 170 to 240 J/g.

The ultra-high molecular weight ethylene homopolymer may have a crystallinity of 60 to 80%, preferably 60 to 70%.

The UHMW homopolymer of the invention may have a tensile strength value (N/tex) at a draw ratio of 200 of 2.6 N/tex or more, such as 2.6 to 3.5 N/tex.

The UHMW homopolymer of the invention may have a tensile strength value (N/tex) at a draw ratio of 100 of 1.8 N/tex or more, such as 1.8 to 2.8 N/tex.

The UHMW homopolymer of the invention may have a tensile strength value (N/tex) at a draw ratio of 100 or more of 1.8 N/tex or more.

The UHMW homopolymer of the invention may have a tensile modulus value (N/tex) at a draw ratio of 200 of 180 N/tex or more, such as 180 to 250 N/tex.

The UHMW homopolymer of the invention may have a tensile modulus value (N/tex) at a draw ratio of 100 of 150 N/tex or more, such as 150 to 220 N/tex. The UHMW homopolymer of the invention may have a tensile strength value (N/tex) at a draw ratio of 100 or more of 150 N/tex or more.

Blends

The UHMWPE homopolymer of the invention can be used on its own in various applications highlighted below or may be combined with other polymer components. In particular the UHMWPE homopolymer might be combined with HDPE.

The UHMWPE can also be combined with standard polymer additives as is well known in the art. Two or more different UHMWPE homopolymers of the invention may also be combined to form a blend.

Applications

The UHMW homopolymer of the invention can be used to make all manner of articles. They are of primary interest in the formation of tapes. It is a particular feature of the invention that the polymers may allow the formation of exceptionally strong tapes for applications where such strength is important such as in ballistic applications and medical implants.

UHMWPE homopolymer of the invention can be processed by compression moulding, screw extrusion or ram extrusion. Prior to solid state drawing, the synthesised polymers can be compression moulded below their melting temperature. Tapes of the invention have high tensile modulus and high breaking tenacity.

It will be appreciated that the preferred features of the polymers of the invention as described herein can all be combined with each other in any way.

The invention will now be described with reference to the following non limiting examples and figures.

ANALYTICAL TESTS

Melt Flow Rate

Figure 1:
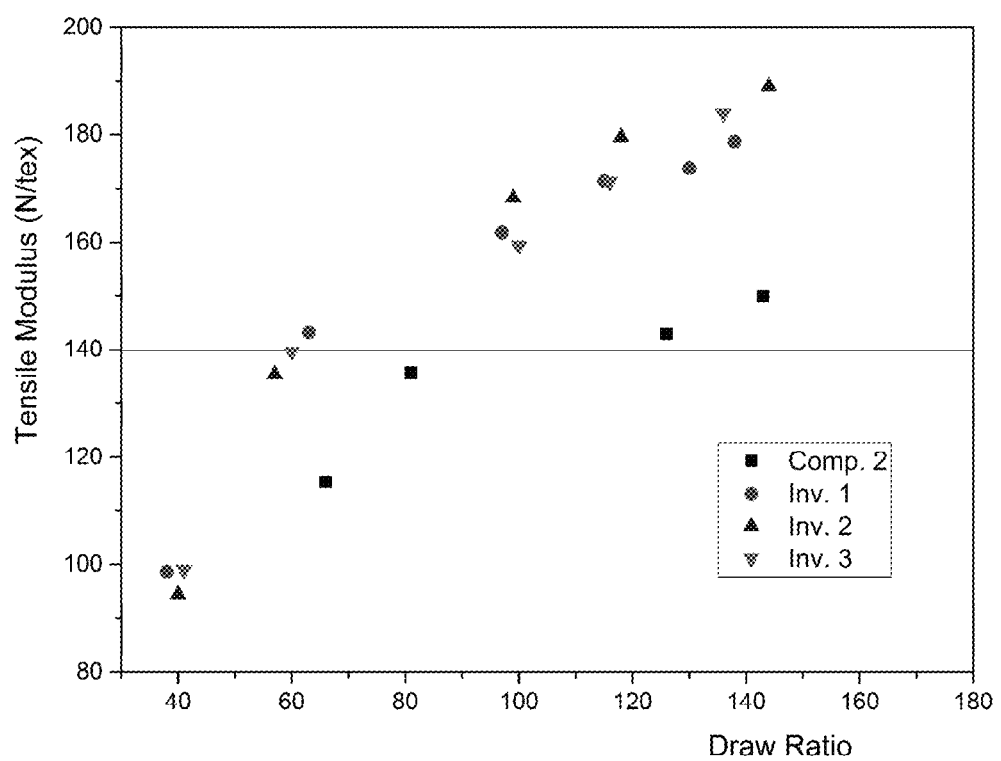
FIG. 1 shows the tensile modulus (N/tex) of comparative example 2 and inventive examples 1 to 3 as a function of draw ratio.

The melt flow rate (MFR) is determined according to ISO 1133 and is indicated in g/10 min. The MFR is an indication of the melt viscosity of the polymer. The MFR is determined at 190° C. for polyethylene. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Density

Density of the polymer was measured according to ISO 1183/1872-2B.

Thermal Properties

All experiments are performed using a TA Q2000 differential scanning calorimeter. Polyethylene samples are weighted in low mass aluminium Tzero pans and lids on a XS3DU Mettler Toledo precision balance (sensitivity of ±0.001 mg). Between 1-5 mg of sample is used for performing DSC experiments. To avoid any thermal oxidation the experiments are conducted under a nitrogen atmosphere with a flow rate of 50 mL/min. A heating—cooling—heating temperature ramp from 50 to 180° C. is performed at a linear rate of 10° C./min. The heat of fusion and peak melting temperature are determined by integrating the melting peak from 100 to 160° C. using the sigmoidal horizontal baseline integration option in the universal analysis 2000 software.

The crystallinity is determined against the theoretical value of heat of fusion of 100% crystalline PE of 293 J/g.

Molecular Weight

For the pre-polymerised material molecular weight averages, molecular weight distribution (Mn, Mw, Mz MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} \left(\frac{A_i}{M_i}\right)} \quad (1)$$

$$M_w = \frac{\sum_{i=1}^{N} ([A]_i \times M_i)}{\sum_{i=1}^{N} A_i} \quad (2)$$

$$M_z = \frac{\sum_{i=1}^{N} ([A]_i \times M_i^2)}{\sum_{i=1}^{N} \left(\frac{A_i}{M_i}\right)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data. All samples were prepared in the concentration range of 0.5-1 mg/ml and dissolved at 160° C. for 2.5 hours for PP or 3 hours for PE under continuous gentle shaking.

Uniaxial Solid-State Deformation

A general procedure for the preparation of tapes is as follows: 25 g of polymer powder is poured into a mold with a cavity of 620 mm in length and 30 mm in width and compression-molded at 130 bar for 10 min to form a sheet. The sheet is preheated for at least 1 min and rolled with a Collin calander (diameter rolls: 250 mm, slit distance 0.15 mm, inlet speed 0.5 m/min). The tape is immediately stretched on a roll (speed 2.5 m/min). The rolled and stretched tape is further stretched in two steps on a 50 cm long oil heated hot plate. The tape comes in contact with the hot plate after 20 cm from the entrance of the hot plate. The draw ratio is obtained by dividing specific weight of the sheet prior to deformation by the specific weight of the tape after stretching.

Tensile Testing

Tensile properties are measured using an Instron 5566 tensile tester at room temperature (25_C). To avoid any slippage, the side action grip clamps with flat jaw faces are used. The nominal gauge length of the specimen is 100 mm, and the test is performed at a constant rate of extension (crosshead travel rate) 50 mm/min. The breaking tenacity (or tensile strength) and modulus (segment between 0.3 and 0.4 N/tex) are determined from the force against displacement between the jaws.

EXAMPLES

Catalyst Preparation —ZN1

Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, TiCl$_4$ (1.47 mol/kg silica) was added during at least 1 hour at 55° C. to the reactor. The slurry was stirred at 50-60° C. for five hours. The catalyst was then dried by purging with nitrogen. Molar composition of the ready catalyst is: Al/Mg/Ti=1.5/1.4/0.8 (mol/kg silica). This catalyst is called ZN1 herein.

Ethylene Homo-Polymerisation Procedure

The polymerisation experiments were carried out in a 3 L bench scale reactor. About 100 mg of ZN1 catalyst was used in all the polymerisations and triethylaluminium (TEA) was used as co-catalyst with an Al/Ti ratio of 15.

Prepolymerisation Step

To an empty 3.0 L reactor 1250 ml of propane was fed to the polymerisation reactor as a polymerisation medium. After addition of the reaction medium, hydrogen was introduced (0.4-2.5 Bar) after which temperature was increased to 70° C. A batch of ethylene (3.7 bar) was added, then reactor pressure was allowed to be stable at 0.2 bar of overpressure and stirring speed was increased to 450 rpm. Then the catalyst and the co-catalyst were added through automatic feeding using nitrogen and 100 ml of propane. The total reactor pressure was 30.0-33.5 bar depending upon the amount of hydrogen used, which was maintained by continuous ethylene feed. The prepolymerisation was stopped after 1-5 g of ethylene was consumed (prepoly degree=1-6%).

The Mw of the pre-polymerisation fraction and the relative amount of pre-polymerisation fraction is presented in Table 1. Higher hydrogen concentrations lead to lower Mw in the prepolymer. Longer residence time leads to a higher wt. % of the prepolymer in the overall UHMWPE.

Polymerisation Step

After the desired degree of pre-polymerisation was achieved, the volatile components were flushed and the reactor was cooled to 20° C. 1500 ml of propane was fed to the polymerisation reactor as a polymerisation medium. The reactor was warmed to the desired temperature (30-40° C.). Dimethoxydimethylsilane as an external electron donor was added to the polymerisation reactor (mole ratio: Si/Ti=1.25). A batch of ethylene (4-6 bar) was added, then reactor pressure was allowed to be stable at 0.2 bar of overpressure and stirring speed was increased to 450 rpm. The total reactor pressure was 16-21 bar depending upon the polymerisation temperature and ethylene pressure, which was maintained by continuous ethylene feed. Polymerisation time was 60 min after which the polymerisation was stopped by venting off the monomer together with the reaction medium. Activity of the catalyst was measured on the basis of the amount of polymer produced (Activities are in the range of 0.5-2.0 kgPO/g Cat/h). The detailed conditions for the series of experiments are listed in Table 1.

$T_{onset}$, Tm, Width, $\Delta H$ and crystallinity results are disclosed in Table 2. The $MFR_{21}$ value is too low to be measured. The polymers of the inventive examples have densities of 955-957 kg/m³.

Comparative example 1 corresponds to example IE3 of WO2015/121162, i.e. prepared without any pre-polymerisation step. This polymer could not be processed in solid-state and was thus not used in further testing.

Figure 2:
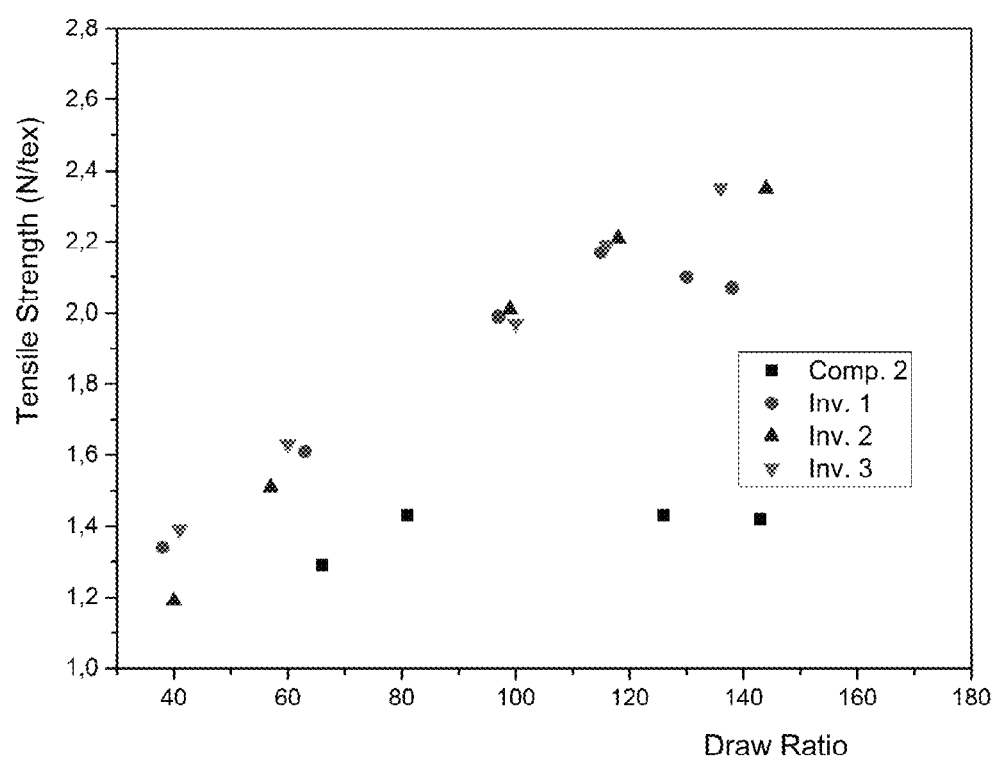
FIG. 2 shows the tensile strength (N/tex) of comparative example 2 and inventive examples 1 to 3 as a function of draw ratio.
Figure 3:
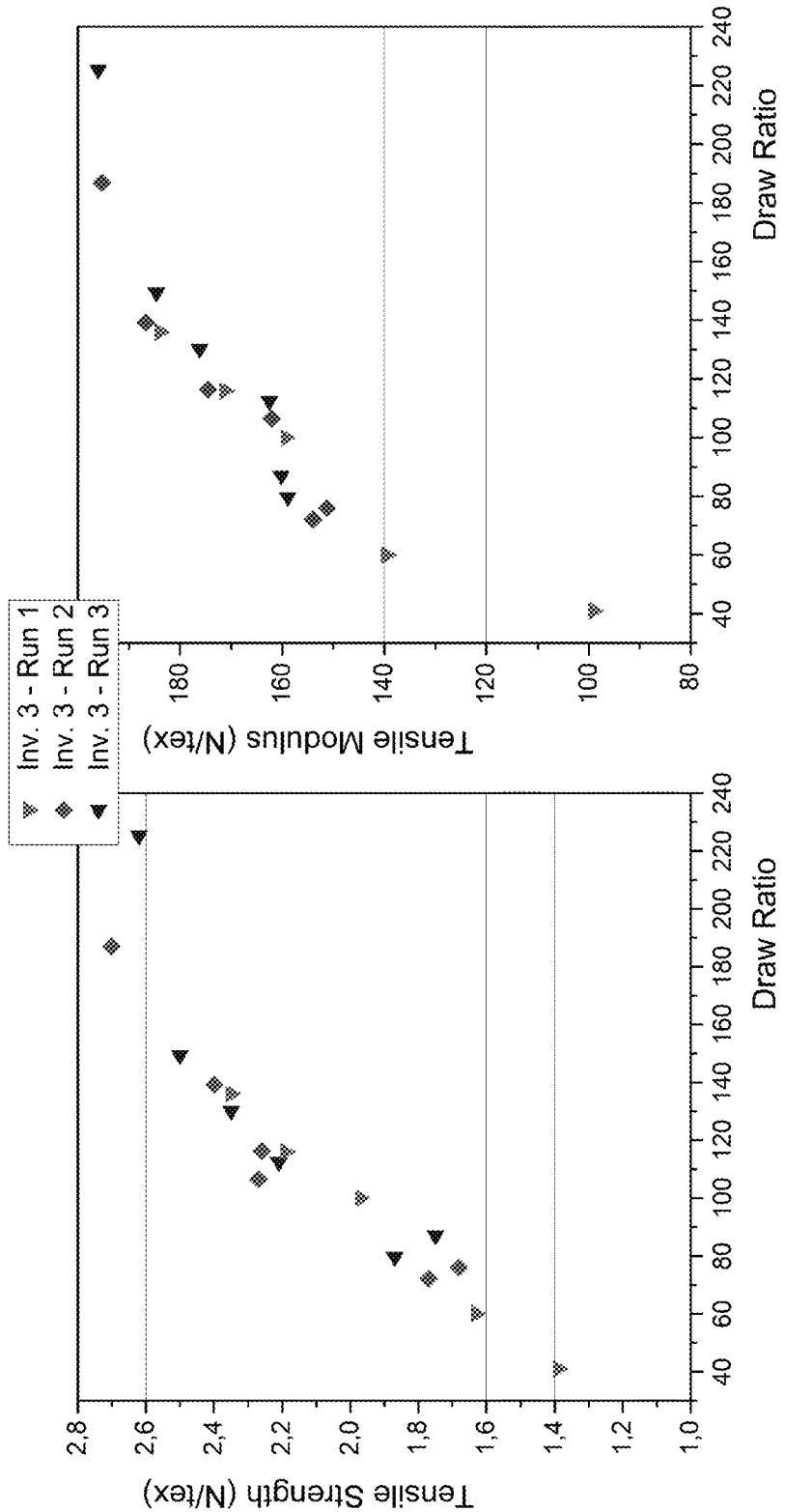
FIG. 3 shows the reproducibility of the polymerisation of Inventive example 3 with the tensile strength and tensile modulus data.

In comparative example 2 the Mw of the pre-polymer is only 20×10³ g/mol and the monomer pressure in the main polymerization is 4 bar, i.e. below the preferred minimum pressure of 5 bar. The polymer of comparative example 2 was still processable in solid-state, but the tensile modulus and tensile strength are lower than the inventive polymers for a given draw ratio as can be seen in the FIGS. 1 and 2.

TABLE 1

| Example | Prepol. Fraction (wt. %) | Prepol. Mw (10³ g/mol) | Main Polym. Temp. (° C.) | Monom. Press. (bar) | Processing in solid-state |
|---|---|---|---|---|---|
| Comp. 1 | 0.0 | — | 40 | 4 | No |
| Comp. 2 | 6.0 | 20 | 40 | 4 | Yes |
| Inv. 1 | 3.0 | 150 | 30 | 6 | Yes |
| Inv. 2 | 1.5 | 500 | 30 | 6 | Yes |
| Inv. 3* | 3.0 | 150 | 30 | 6 | Yes |

*Without External Donor

TABLE 2

| Experiment | $T_{onset}$ (° C.) | $T_m$ (° C.) | Width (° C.) | $\Delta H_{melt}$[1] J/g | Crystallinity % |
|---|---|---|---|---|---|
| Comp 2 | 133.7 | 138.8 | 4.4 | 191 | 65 |
| Inv 1 | 136.3 | 139.8 | 3.1 | 188 | 64 |
| Inv 2 | 137.1 | 140.5 | 3.0 | 186 | 63 |
| Inv 3 | 136.1 | 139.6 | 3.2 | 181 | 62 |

[1]Considering the melting enthalpy of 100% crystalline to be 293 J/g

Uniaxial Solid-State Deformation

After compression, the samples were pre-stretched by rolling below the melting point of the polymer as obtained from the reactor. The calendaring (rolling) step combined by stretching resulted in a draw ratio of 10. The rolling step is applied to achieve homogeneity in the strip and to avoid extrinsic failure during uniaxial drawing. The second stretching step on the rolled and the prestretched tapes was carried out at approx. 148-153° C. Results are given in Table 3.

TABLE 3

| Experiment | Compression ° C. | Rolling/Pre-stretching ° C. | Stretching ° C. | Failure |
|---|---|---|---|---|
| Comp 2 | 133 | 131/136 | 148 | No |
| Inv 1 | 135 | 136/143 | 151 | No |
| Inv 2 | 136 | 136/143 | 152 | No |
| Inv 3 | 134 | 136/143 | 151 | No |

The invention claimed is:

1. An ultra-high molecular weight ethylene homopolymer having an $MFR_{21}$ of 0.01 g/10 min or less having:
    a peak melting point is 137 to 142.0° C.;
    $\Delta H_{melt}$ is 170 to 240 J/g;
    a crystallinity of 60 to 80%; and
    a density in the range 945 to 980 kg/m³.

2. An ultra-high molecular weight ethylene homopolymer as claimed in claim 1 wherein the density of the homopolymer is in the range of 955 to 975 kg/m³.

3. The ultra-high molecular weight (UHMW) ethylene homopolymer as claimed in claim 1 comprising:
    (I) an ethylene prepolymer component having an Mw of 40,000 to 600,000 g/mol;
    (II) an UHMW ethylene homopolymer component;
    wherein the UHMW ethylene homopolymer comprises up to 8 wt. % of said prepolymer component.

4. An article comprising the ultra-high molecular weight ethylene homopolymer as claimed in claim 1.

5. The article of claim 4, wherein the article is tape.

6. An ultra-high molecular weight ethylene homopolymer having an $MFR_{21}$ of 0.01 g/10 min or less having:

a peak melting point is 137 to 142.0° C.;
$\Delta H_{melt}$ is 170 to 240 J/g; and
a crystallinity of 60 to 80%;
    wherein the ultra-high molecular weight ethylene homopolymer comprises:
        (I) an ethylene prepolymer component having an Mw or 40,000 to 600,000 g/mol;
        (II) an UHMW ethylene homopolymer component;
    wherein the UHMW ethylene homopolymer comprises up to 8 wt. % of said prepolymer component.

7. The ultra-high molecular weight ethylene homopolymer as claimed in claim 6 wherein the density of the homopolymer is in the range of 945 to 980 kg/m³.

8. An ultra-high molecular weight ethylene homopolymer as claimed in claim 6 wherein the density of the homopolymer is in the range of 955 to 975 kg/m³.

9. An article comprising the ultra-high molecular weight ethylene homopolymer as claimed in claim 6.

10. The article of claim 9, wherein the article is tape.

\* \* \* \* \*